United States Patent
Koenig et al.

(10) Patent No.: US 6,685,437 B2
(45) Date of Patent: Feb. 3, 2004

(54) HYDRAULIC TRANSMISSION PUMP ASSEMBLY HAVING A DIFFERENTIAL ACTUATION AND INTEGRATED LINE PRESSURE CONTROL

(75) Inventors: Melissa Koenig, Howell, MI (US); William Vukovich, White Lake Township, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 17 days.

(21) Appl. No.: 09/960,689

(22) Filed: Sep. 21, 2001

(65) Prior Publication Data

US 2003/0059310 A1 Mar. 27, 2003

(51) Int. Cl.[7] ................................................. F04B 49/00
(52) U.S. Cl. ........................ 417/15; 417/44.1; 417/44.2; 418/171
(58) Field of Search ........................ 417/15, 44.1, 44.2, 417/280, 293, 374

(56) References Cited

U.S. PATENT DOCUMENTS

| | | | |
|---|---|---|---|
| 4,295,792 A | * 10/1981 | Tachibana et al. | ............ 417/15 |
| 4,458,318 A | * 7/1984 | Smit et al. | .................... 701/51 |
| 4,540,347 A | 9/1985 | Child | |
| 4,680,987 A | * 7/1987 | Morimoto | .................... 477/39 |
| 4,719,998 A | * 1/1988 | Hiramatsu et al. | .......... 477/175 |
| 4,747,744 A | 5/1988 | Dominique et al. | |
| 4,976,594 A | 12/1990 | Bernstrom | |
| 5,261,803 A | 11/1993 | Freeman | |
| 5,282,722 A | * 2/1994 | Beatty | ....................... 417/44.2 |
| 5,299,920 A | * 4/1994 | Stearns | ....................... 417/426 |
| 5,395,217 A | 3/1995 | Hoffmann et al. | |
| 5,413,470 A | * 5/1995 | Eisenmann | .................. 418/171 |
| 5,474,428 A | * 12/1995 | Kimura et al. | ............. 417/44.1 |
| 5,476,374 A | 12/1995 | Langreck | |
| 5,554,019 A | 9/1996 | Hodge | |
| 6,059,534 A | * 5/2000 | Kotake et al. | ................. 417/15 |
| 6,135,919 A | * 10/2000 | Shimakura | ................... 477/157 |

* cited by examiner

*Primary Examiner*—Cheryl J. Tyler
(74) *Attorney, Agent, or Firm*—Bliss McGlynn, P.C.; Greg Dziegielewski

(57) ABSTRACT

A hydraulic transmission pump assembly includes a pump adapted to provide fluid under pressure to predetermined components in a transmission, an electric motor operatively coupled to the pump, and a line pressure control device in electrical communication with the electric motor. The line pressure control device is operable to control the electric motor as to cause it to drive the pump when engine speeds are below a predetermined level such that the pump provides fluid at a predetermined volume and pressure to the transmission during this operating condition. A differential gear assembly is also included that is interposed between an engine and the electric motor, the differential gear assembly acting to drive both the pump and the electric motor when engine speeds are above the predetermined level such that the pump provides fluid at a predetermined volume and pressure to the transmission and the electric motor provides generated electricity.

20 Claims, 3 Drawing Sheets

HYDRAULIC TRANSMISSION PUMP ASSEMBLY HAVING A DIFFERENTIAL ACTUATION AND INTEGRATED LINE PRESSURE CONTROL

FIELD OF THE INVENTION

The present invention relates generally to a hydraulic transmission pump assembly and, more specifically, to a hydraulic transmission pump assembly having differential actuation with an integrated line pressure control that supplies hydraulic power to a vehicle transmission.

DESCRIPTION OF THE RELATED ART

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Transmissions generally include one or more gear sets. One type of gear set commonly employed in automatic transmissions is a planetary gear set, named for the relative rotation of the "planet gears" that each rotate on their individual axis while revolving around a "sun gear". Planetary gear sets are made up of three components, all in constant mesh; a sun gear, a planetary carrier with planet gears, and a surrounding ring gear or internal gear. When one component is held stationary, and another component is rotated, the third component is driven at either a reduction, or an increase in speed, or a rotation in the opposite direction. The planetary gear sets that are commonly used in today's automatic transmissions are actually "compound planetary gear sets" because they are basically two planetary sets that have common parts. Most 3-speed transmissions, for example, use two ring gears, two planetary carriers, and a common sun gear that is axially long enough to mesh with both planetary carriers. By changing which components are rotated by the engine, and which components are "held", two different gear reductions (1st gear, and 2nd gear) and reverse, as well as a 1:1 ratio (third gear) can be obtained. Thus transmissions typically include a plurality of clutch or brake assemblies that are employed as holding mechanisms in the transmission.

One example of a device used as a "holding" mechanism in a transmission is a one-way clutch. One-way clutches have inner and outer races that allow relative rotation of the two races in one direction but lock together in the opposite rotational direction. In application, when the races are fixed on concentric shafts, the shafts will be held together in one rotational direction, and be able to freewheel in the other rotational direction.

Multi-disk pack friction clutches are another example of a clutch assembly that is commonly employed for this purpose in a transmission. The multi-disk pack friction clutch or brake assembly usually employs a clutch subassembly including a set of plates and a set of friction disks that are interleaved between one another. The plates and friction disks are bathed in a continual flow of lubricant. The clutch or brake assembly also typically includes an actuating piston. When a component of a gear set is to be held, as for example during a particular gear change, a piston is actuated so as to cause the plates and friction disks to come into contact with respect to one another. In certain applications, it is known to employ several one-way clutches or multi-disk pack friction devices in combination to establish different drive connections throughout the transmission to provide various gear ratios in operation, or to brake a component. Thus, it is necessary to provide lubrication to the gear sets and the holding and shifting devices within the transmission in order to ensure their smooth and efficient operation while avoiding undue wear. Additionally, the lubrication functions to remove excess heat and cool the internal components of the transmission to within acceptable designed operating temperatures.

Within the transmission, the multi-disk friction clutches, brake systems, and gear sets have traditionally relied on a continuous "splash" supply of coolant, typically an oil, known generally as automatic transmission fluid (ATF), to remove the heat generated during operation and lubricate various moving parts. To this end, the transmission typically includes a hydraulic pump that provides ATF under pressure to supply various components with the fluid pressure necessary to actuate, lubricate and cool such components. The transmission pump is powered by the vehicle's engine through some manner of connection with an input shaft. The pump draws ATF from a reservoir, or sump, through a filter. The ATF pressure is typically regulated by means of a solenoid-actuated pressure regulator valve located downstream, or after the pump. The solenoid actuates a valve member within the regulator body, which opens a return path in the main transmission pressure line. This return path reroutes the excess fluid flow back to the transmission sump. The regulator valve and its control solenoid are generally operated by an electrical interaction with a vehicle, or transmission, control module. In this way, the fluid pressure and flow in the main transmission pressure line are regulated to a desired value. Alternatively, some transmissions employ a less complex mechanical spring biased pressure regulator for the same purpose.

By having the pump driven by a power input of the vehicle's engine, the resulting ATF fluid flow from the pump through the transmission main line, in both pressure and quantity, is proportional, or "linear", with respect to engine speed. Conversely, the transmission generally requires ATF at constant volume and pressure across its operating range. Since conventional transmission pumps are driven by the vehicle engine, the conventional transmission pump and its mechanical drive components are sized so as to meet all possible lubrication, actuation and cooling requirements of the transmission when the engine, and thereby the pump mechanism, is at idle. Thus, whenever the engine speed is elevated above idle, the transmission pump produces a greater volume and pressure of ATF than is required and the supply of ATF is excessive. This excess amount of ATF flow is simply returned to the sump, by the regulator valve, as wasted energy. This wasted energy is an unnecessary mechanical loss that drains power from the engine, reducing transmission and overall vehicle efficiency.

Looking further ahead to new technological advances in automotive design, hybrid vehicles with multiple power sources and multiple power transfer operating modes are emerging. Hybrid vehicle designs can provide both low emissions and improve fuel economy. In order to do this, some hybrid vehicle designs switch drive modes between electrical power and conventional engines in such a manner that the internal combustion engine may be below a standard, or conventional idle speed, or off, at times during vehicle operation. This could occur when there is no forward movement of the vehicle (e.g., at a stoplight), or when the vehicle is coasting, or when driven solely by the electrical power source. This highlights another disadvantage in conventional transmission pump designs; namely, with the internal combustion engine at a below idle condition, there is little, or no, ATF flow. Thus, there is a need in the art to meet the lubrication, cooling and actuation requirements of the transmission in a hybrid vehicle during these operating conditions.

This drawback to the conventional automatic transmission pump can also be seen in conventional vehicles in one other specific instance. If the engine is off in a conventional vehicle, yet the vehicle's drivetrain is moving, for example where a vehicle is being towed, there is no ATF lubrication being provided to the bearings and gear sets of the transmission. Simply towing the vehicle could cause damage to the internal workings of the transmission itself.

In light of the above, those having ordinary skill in the art will appreciate that specific disadvantages to conventional transmission ATF pump construction and operation exist. The first being the excessive ATF flow delivery for engine speeds at or above idle, which results in a drain to the engine's power resources and second, the inability of conventional designs to adequately supply the transmission with ATF during engine off or below idle conditions. These disadvantages created the need for a transmission pump design that is both more efficient and is able to operate when the vehicle's engine is below idle, off, or otherwise disconnected, but transmission and thereby vehicle operation is required. This need has been answered by newer designs that incorporate an electric driven hydraulic transmission pump. While these designs have answered some of the disadvantages associated with the conventional transmission pump applications, others have arisen. Generally, these designs use the electric pump to completely take over the duties of the mechanically driven pump or substantially supplement it for the delivery of ATF pressure. This approach requires that the ATF supply system still rely solely on downstream pressure regulators to dump off excessive fluid back to the sump. While these system approaches are better than their predecessors, they still are inefficient reactive type systems. In other words, the system waits until excessive pressure builds up and then just dumps it off, rather than continuously monitoring the delivery of the ATF and controlling its pressure accurately and efficiently to properly meet the demands of the transmission. Therefore, there still exists a need to provide a system that can offer the advantages of ATF delivery through an electric motor, either in solo or in supplementation of a mechanical pump, but provide a monitored and controlled system that is more efficient and can closely follow the demands of a new generation of transmission.

SUMMARY OF THE INVENTION AND ADVANTAGES

The hydraulic transmission pump assembly of the present invention overcomes the disadvantages in the related art as a pump adapted to provide fluid under pressure to predetermined components in a transmission and to regulate the fluid delivery during all operating conditions. The hydraulic transmission pump assembly includes a pump adapted to provide fluid under pressure to predetermined components in a transmission, an electric motor operatively coupled to the pump, and a line pressure control device in electrical communication with the electric motor. The line pressure control device is operable to control the electric motor as to cause it to drive the pump when engine speeds are below a predetermined level such that the pump provides fluid at a predetermined volume and pressure to the transmission during this operating condition. A differential gear assembly is also included that is interposed between an engine and the electric motor. The differential gear assembly acts to drive both the pump and the electric motor when engine speeds are above the predetermined level such that the pump provides fluid at a predetermined volume and pressure to the transmission and the electric motor provides generated electricity.

Accordingly, the present invention provides a hydraulic transmission pump having a differential actuation with an integrated line pressure control device that overcomes the drawbacks of conventional designs, which cannot provide proper ATF flow to the transmission when the engine is off or below idle speed. Additionally, the present invention is more efficient than the prior art as it provides the required, regulated ATF flow anytime the engine is at idle or above, while concurrently converting any excess applied engine power into usable electrical energy that is fed back to the vehicle electrical system. Furthermore, these objectives are achieved by the present invention in an efficient, cost effective and relatively simple manner.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENT(S)

Figure 1:
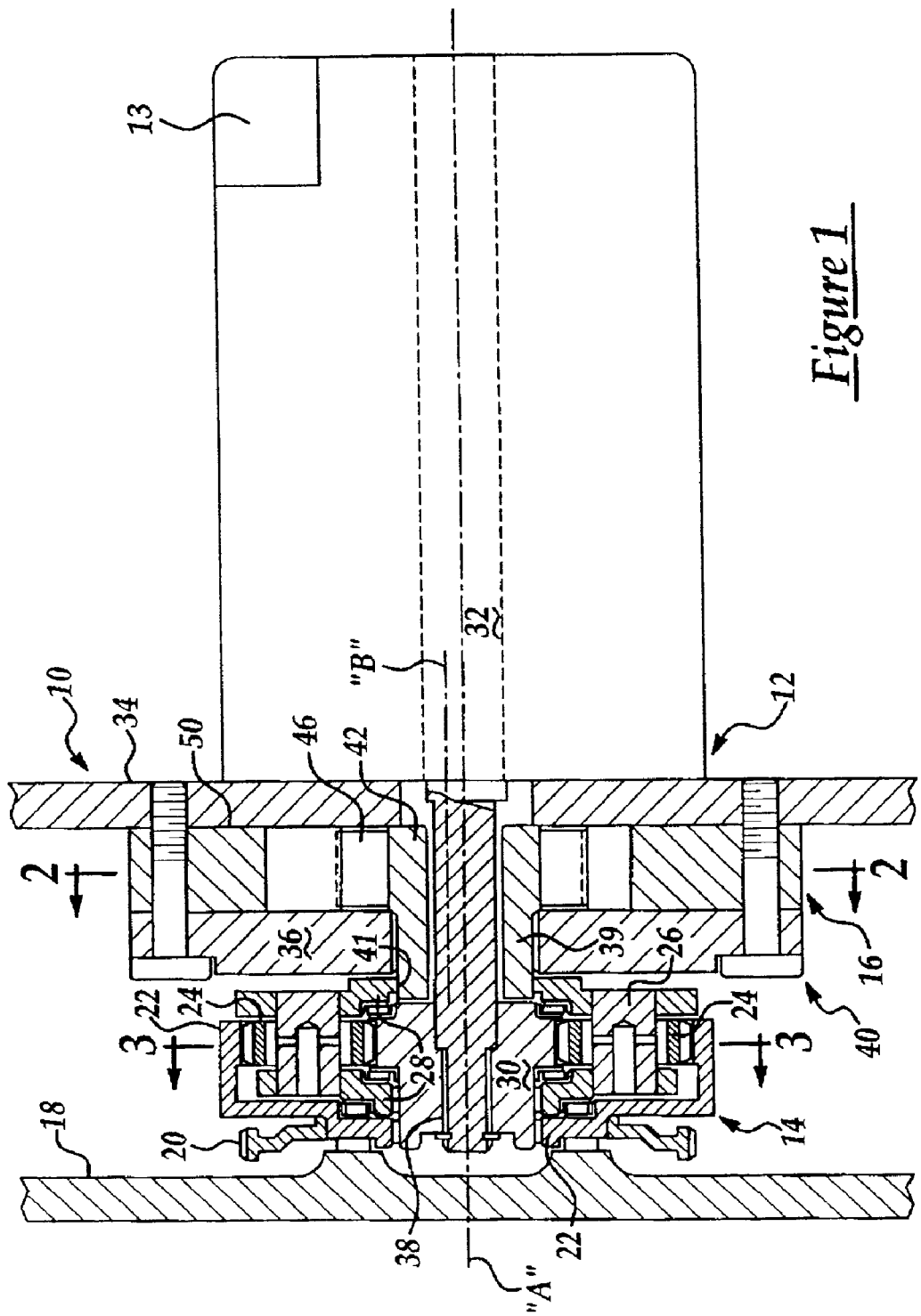
FIG. 1 is a side view of the hydraulic transmission pump assembly of the present invention.

The hydraulic transmission pump assembly of the present invention is generally indicated as 10, in FIG. 1 when like numerals are used to describe like structure throughout the figure. The hydraulic transmission pump assembly 10 includes an electric motor, generally indicated at 12, differential gear set assembly, generally indicated at 14, and a hydraulic pump, generally indicated at 16. The differential 14 is in the form of a planetary-type gear set. The electric motor 12 is illustrated with an integrated line pressure control device 13, which will be described in greater detail below.

Figure 3:
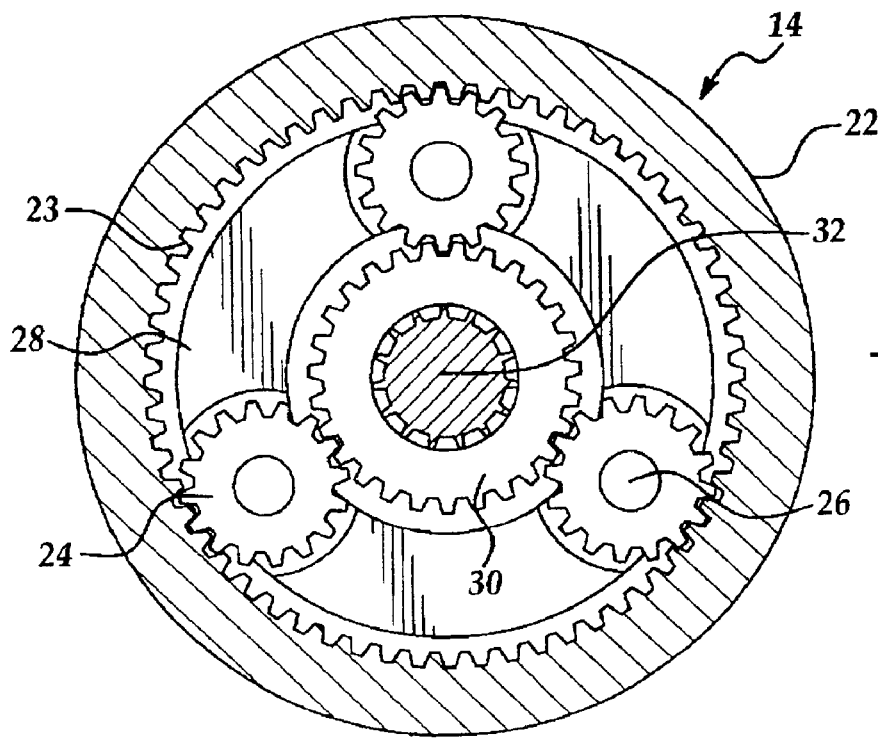
FIG. 3 is a cross-section view of a planetary differential gear set of the hydraulic transmission pump assembly of the present invention.

With reference to FIGS. 1 and 3, the differential 14 is mounted to a support structure 18 and includes an input gear 20 operatively coupled to a ring gear 22. Motive rotational power is provided to the input gear 20 from a power input (not shown) of the vehicle's engine. Ring gear 22 has internal teeth 23 adapted to mesh with a plurality of planetary gears 24. The planetary gears 24 are mounted on individual stub shafts 26 that are fit within a carrier frame 28.

The planetary gears 24 also mesh with a singular central sun gear 30. In the preferred embodiment, the planetary gear carrier frame 28 is of a two-piece design press-fit together on the stub shafts 26 over and partially encapsulating the sun gear 30. Sun gear 30 is splined to a central shaft 32 that interconnects the differential 14 and the electric motor 12.

The transmission pump, generally indicated at 16, is mounted to another support member 34. The pump support member 34, in combination with pump bore member 50 and pump end member 36 comprises the pump body, generally indicated at 40. As shown in FIG. 1, pump support member 34 is in alignment with support member 18 such that pump body 40 and differential 14 are brought into alignment and cooperative interconnection along longitudinal axis "A" when these portions of the present invention are assembled. Those having ordinary skill in the art will appreciate that the support members 18 and 34 depicted in the figures may include any convenient structural member commonly associated with the transmission or surrounding vehicle structure and that the support members 18 and 34 per se, as illustrated in the figures, form no part of the present invention. In the preferred embodiment, the transmission pump 16 is gerotor type pump having a gear set comprised of a first or inner pumping gear pumping element 42 having external teeth 44 and a second or outer pumping gear pumping element 46 having internal teeth 48.

Figure 2:
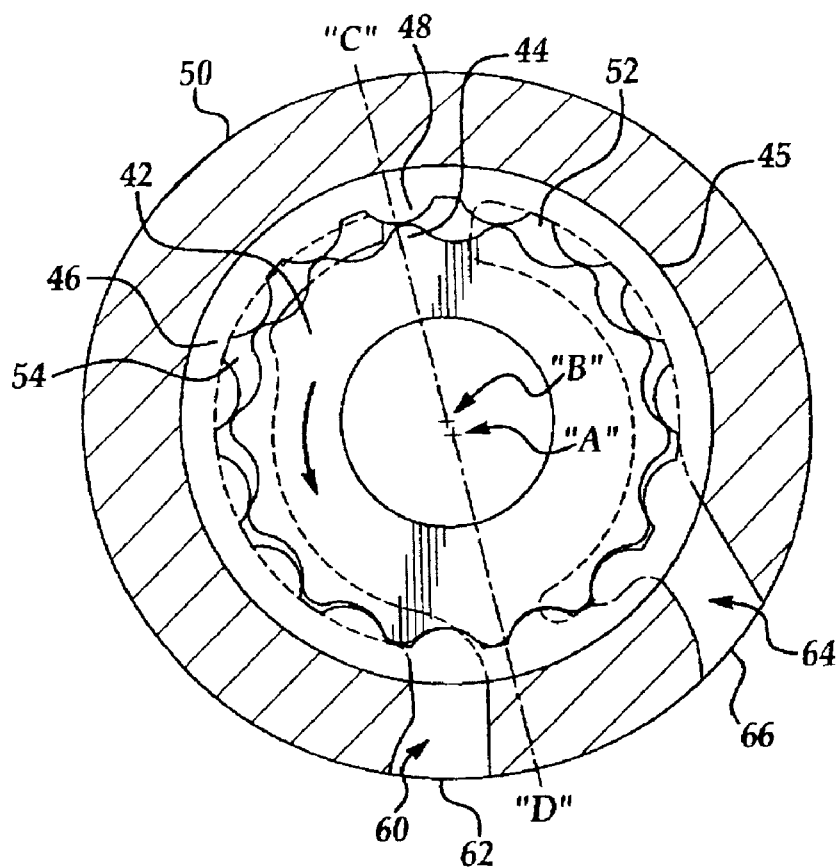
FIG. 2 is a cross-section view of a gerotor pump of the hydraulic transmission pump assembly of the present invention.

Referring now to FIGS. 1 and 2, the outer surface of the outer gear pumping element 46 is smooth finished and is disposed within a bore opening 45 of the pump bore member 50 in a close-tolerance, but rotatable fit. The number of external teeth 44 in the inner gear pumping element 42 is one less than the number of teeth 48 in the outer gear pumping element 46. The inner gear pumping element 42 is disposed within the outer gear element in such a manner that all the teeth 44 and 48 are in some form of continuous contact, from fully engaged to almost disengaged.

As best shown in FIG. 2, the outer gear pumping element 46 is disposed within the pump bore member 50 on a radial axis "B". The inner gear pumping element 42 is disposed within the outer gear element inline with central axis "A". Radial axis "B" is eccentric to the central axis "A" and thereby the outer gear pumping element 46 is offset relative to the radial axis of the inner gear pumping element 42. The bore opening 45 of pump bore member 50 is centered on axis "B" which accommodates the offset axial displacement of the outer gear pumping element 46. In this manner, as the inner gear member 42 rotates about axis "A", it drives outer gear pumping element 46 in the bore opening 45, such that the meshing of the teeth 44 and 48 creates spaces between the gear teeth that define pumping chambers 52 and 54, which expand and contract respectively as the elements rotate. As further shown in FIG. 2, as the gear elements rotate, their teeth pass through a line shown as "C–D". Line C–D is drawn through the axes "A" and "B" and indicates the radial points in the rotation of the gear members 42 and 46 at which the teeth 44 and 48 are at their most open and most fully engaged, respectively. In other words, the spaces between the teeth transition from expanding chambers 52 to contracting chambers 54, and vice versa, as the teeth of the gear set pass through the respective "C" and "D" radial points of their rotation. Within the pump bore member 50 and the pump end member 36, an inlet passage 64 and an inlet port 66 are machined, in a known manner, through to an area that meets the meshing teeth at a point in their rotation where they form expanding chambers 52. The pump bore member 50 and the pump end member 36 further have an outlet passage 60 and an outlet port 62 also machined, in a known manner, through to an area that meets the meshing teeth where they are forming contracting chambers 54.

Figure 4A:
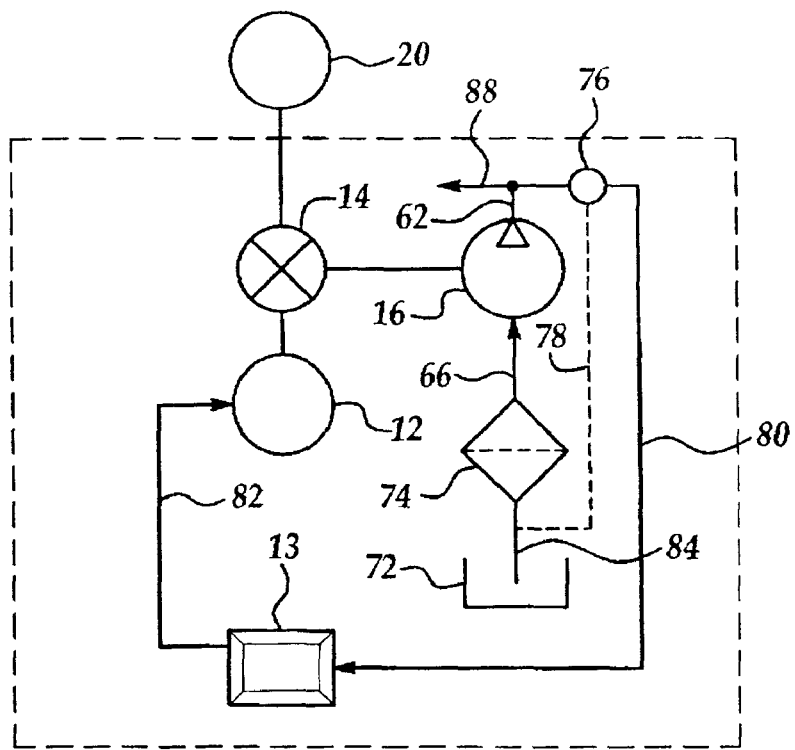
FIG. 4A is a schematic view of the hydraulic transmission pump assembly of the present invention having an integrated line pressure control device.
Figure 4B:
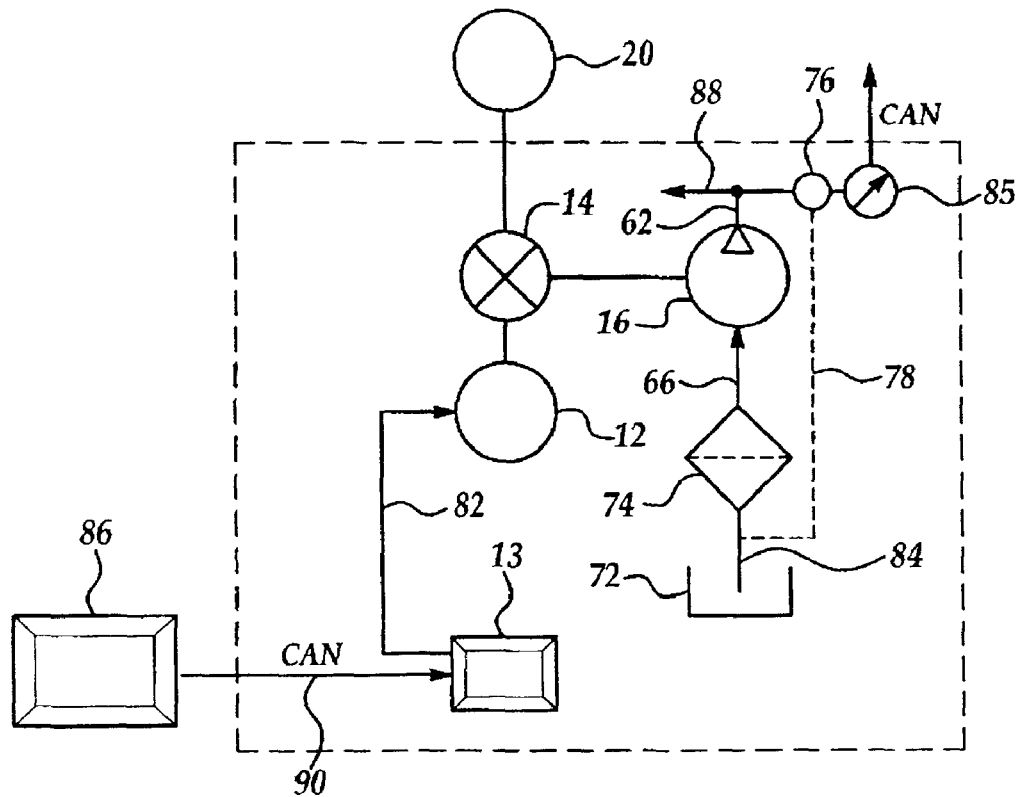
FIG. 4B is a schematic view of the hydraulic transmission pump assembly of the present invention having an integrated line pressure control device within a controller area network (CAN) system.

As schematically represented in FIGS. 4A and 4B, inlet port 66 is in fluid connection with ATF line 84 which is routed from the transmission sump 72 through ATF filter 74 and the outlet port 62 is in fluid connection with line 88, which would allow for further distribution and delivery of ATF throughout the transmission as required. Also shown in FIGS. 4A and 4B, a pressure monitoring device 76 is in fluid connection with transmission line 88. Depending on the particular embodiment, each described in greater detail below, the pressure monitoring device 76 may be a sensor, or a pressure regulator, or a combined sensor and pressure regulator.

As shown in FIG. 1, the electric motor, generally indicated at 12, is disposed upon the pump support member 34 on the opposite side of the support member from the pump body 40. The pump body 40, differential 14, and electric motor 12 are all brought into alignment and cooperative interconnection along longitudinal axis "A" when these portions of the present invention are assembled. The drive shaft of electric motor 12 serves as the common central shaft 32 of the present invention. The common shaft 32 has a splined area 38 on its circumference that engages the sun gear 30 of the differential 14. Additionally, the inner gear pumping element 42 of the pump 16 has an extended sleeve 39 that engages the carrier frame 28 of the differential gear set 14 at 41. The electric motor 12 is thereby interconnected to the inner gear pumping element 42 of the pump 16 through the sun gear 30, planetary gears 24, and carrier frame 28 of the differential 14.

The electric motor 12 also includes the line pressure control device 13. The line pressure control device 13 is utilized to control the electrical power sent to the electric motor 12 and operatively controls the electrical power as described below. As shown in FIGS. 4A and 4B, the line pressure control device 13 is thereby in operative electrical connection to the electric motor 12 by wiring harness 82. The line pressure control device 13 is also operatively connected to the pressure monitoring device 76, either directly (FIG. 4A) by line 80, or indirectly (FIG. 4B) through a Control Area Network (CAN) digital data system 90, as discussed in greater detail below.

In the preferred embodiment, two operational modes exist. The first operational mode is contemplated when a flow of ATF for the proper operation of the transmission is required yet the vehicle's engine is off or at a below idle condition where an insufficient supply of ATF is available through the mechanical connection to the power input from the engine. Referring to the schematic representation of FIG. 4A, where like structure schematically represented has been described using like reference numbers, if the vehicle engine is off or at below idle, no or very little ATF is being drawn thorough hydraulic line 84 from the sump 72, through the filter 74, to the inlet port 66 of the pump 16. The line pressure control device 13 will sense that the output pressure at the output port 62 of the pump 16, by line 80, has fallen below a predetermined lower value. The line pressure control device 13 will then energize the electric motor 12 to provide the motive power to drive the pump 16 through the differential 14.

In one non-limiting embodiment (FIG. 4A), the pressure monitoring device 76 may be a combined pressure sensor and pressure regulator. In this case, line 80 is an electrical connection from the sensor portion of the pressure monitoring device 76 to the line pressure control device 13. With line 78 depicting a hydraulic line used to reroute ATF back to the sump 72 from the pressure regulator portion of the pressure monitoring device 76 in circumstance where the differential input from the vehicle engine input 20 creates excessive ATF pressure. In another non-limiting embodiment (FIG. 4A), the pressure monitoring device 76 may be only a pressure regulator. In this case, line 80 is a hydraulic line that routes pressurized ATF to the line pressure control device 13, while providing pressure regulation to reroute ATF back to the sump 72 through hydraulic line 78 in circumstance where the differential input from the vehicle engine input 20 creates excessive pressure. In an additional embodiment, the pressure monitoring device 76 may function solely as a pressure sensor. In this case, line 80 is an electrical connection from the pressure-monitoring device 76 to the line pressure control device 13. Line 78 would be absent and the system would completely rely on control of the electric motor 12 by the line pressure control device 13 to avoid conditions of excessive pressure.

It should also be appreciated, by those skilled in the art, that monitoring of the transmission fluid pressure output may be either a function of a higher level vehicle monitoring system that oversees the control of the vehicle and its transmission (which is beyond the scope of this invention), or be a function of the line pressure control device 13 itself, as just described and shown in FIG. 4A. In this regard, by way of an additional non-limiting example, as schematically represented in FIG. 4B, the vehicle may employ a CAN system 90 to digitally integrate the monitoring and control of various engine and transmission functions. As shown in FIG. 4B, the pressure monitoring device 76 feeds data to an interface device 85 which sends the monitored output pressure data of the pump 16 through the CAN system. The interface device 85 sends the monitoring signal across the CAN digital data bus to the vehicle monitoring system. Either the vehicle monitoring system or a transmission control device 86 sends control signals through the CAN system 90 to the line pressure control device 13. As before, the line pressure control device 13 controls the electric motor 12 to drive the pump 16 through the differential 14. Finally, it should be further appreciated that the interface device 85 may be an integrated portion of the pressure monitoring device 76 rather than a physically separate device.

Therefore, regardless of how the output pressure of the pump 16 is monitored, the line pressure control device 13 energizes the electric motor 12 to spin its output shaft 32, which by its interconnection to the inner gear pumping element 42 of the pump 16 through the sun gear 30, planetary gears 24, and carrier frame 28 of the differential 14, drives the pump 16 to produce a pressurized ATF flow. This functionally occurs as the inner gear pumping element 42 rotates, driving the outer gear pumping element 46. ATF, which is supplied to the inlet port 66 and inlet passage 64 of the pump 16, flows into the open expanding chambers 52 between the gear teeth 44 and 48. The expanding chambers 52 pass the ATF, by their rotation in the pump body 40, past axial point "C" at which the gear teeth 44 and 48 begin to mesh together. The gear teeth 44 and 48 then displace the ATF into the outlet passage 60 and outlet port 62 as they rotate toward axial point "D" and mesh closer, contracting the chambers 54, thereby creating a positive pressure and pumping the ATF out. The line pressure control device 13 will de-energize the electric motor 12 if the output pressure from the pump 16 exceeds a predetermined upper value, thereby ensuring an adequate but not excessive flow of ATF to the transmission.

As just described, in one embodiment, the system may be configured to switch the electric motor 12 simply on and off in response to sensed ATF pressure output from the pump 16, or in another non-limiting embodiment, the electric motor 12 may be driven at variable speeds, rather than on or off, to control ATF delivery. It should be appreciated that in this operational mode, when the vehicle engine is off or at below idle speeds, the line pressure control device 13 functions to deliver the ATF in the predetermined required pressure but not in excess, thereby preventing energy losses and waste. Additionally, it should be noted that during the operation of the electric motor 12, while the motor drives the pump 16 through the sun gear 30 and the carrier frame 28 of the differential 14, the physical nature of the planetary gear set prevents any feedback force on the ring gear 22. This occurs as the planet gears 24 in their carrier frame 28 concomitantly revolve and rotate about the sun gear 30 while the ring gear 22 remains stationary.

The second operating mode of the present invention is contemplated when a flow of ATF for operation of the transmission is required and the vehicle's engine is running at or above an idle condition. With the engine running at or above idle, the input gear 20 and thereby the ring gear 22 of the differential 14 will be driven by the operatively connected power input from the vehicle engine. In this second mode, two functional operations occur simultaneously. Primarily, the torque input from the vehicle engine to the differential ring gear 22 causes the planetary gears 24 and the carrier frame 28 to rotate. As shown in FIG. 1, the carrier frame 28 is operatively coupled to the inner gear pumping element 42 of the transmission pump 16, so that the rotation imparted to the carrier frame 28 drives the transmission pump 16 thereby provide a pressurized volume of ATF to the transmission. As discussed previously, pump operation through the vehicle's engine input will flow excessive amounts of ATF above the idle level, so that a simple pressure regulator, or regulator valve, (shown at 76, in FIGS. 4A and 4B) elsewhere in the vehicle transmission, will route the excess flow back to the sump.

Secondarily, as described generally above, the torque input from the vehicle engine that causes the differential ring gear 22, the planetary gears 24, and the carrier frame 28 to rotate, also causes a rotation of the sun gear 30. The sun gear 30, as shown in FIG. 1, is operatively connected to the common central shaft 32, thereby causing rotation of the shaft 32. As previously described, the common central shaft 32 is functionally the extended output shaft of the electric motor 12.

It should be appreciated by those having ordinary skill in the art, that when the electric motor 12 is off (i.e., the windings of the motor are non-energized) and the shaft 32 of the motor is mechanically rotated, that the motor 12 then electrically functions as a generator. This occurs due to the inverse nature of electric motors, in which, as the wound magnetic armature on the shaft of an electric motor is turned, a magnetic field is set up within the motor's field windings, which produces, or generates, an electrical current. In this manner, whenever the electric motor 12 is not energized by the line pressure control device 13 the electric motor 12 of the present invention functions as a generator, creating electrical current from the mechanical energy imparted to its shaft 32 from the vehicle's engine through the differential gear set 14. This generated electrical current is fed back to the vehicle electrical system to either charge the battery or assist in operating other electrically actuated components associated with the vehicle.

Therefore, in summary, the preferred embodiment of the invention provides two operational modes. The first mode utilizes the electric motor 12, as controlled by line pressure control device 13, through the differential gear set 14, to drive the transmission pump 16. This provides regulated ATF flow to the transmission, when the vehicle's engine is off or in a below idle condition. The second mode utilizes a power input from the vehicle's engine, through the differential gear set 14, to drive the transmission pump 16, which provides ATF flow to the transmission, when the vehicle's engine is at or above idle condition. Concurrently in the second mode, the differential 14 allows the excess mechanical power from the engine to be converted into useable electrical energy by diverting the excess mechanical energy to the electric motor 12.

Since the differential gear set 14 is operatively coupled to the vehicle engine such that either the engine or the electric motor 12 can selectively drive the transmission pump 16, variations in the gear ratios within the design of the differential gear set 14 provide for other embodiments. By way of example, whereas the differential gear set 14 of the preferred embodiment allows that the vehicle engine power input provide all the required power at idle or above with the electric motor 12 off; in another non-limiting embodiment, the differential gear set 14 may be designed so as to only take a portion of the drive force for operating the transmission pump 16 from the vehicle engine, the remaining force would be taken from the electric motor 12. Specifically, the differential gear set ratios could be designed so engine power input to the transmission pump 16 would meet all possible lubrication, actuation and cooling requirements of the transmission only when the engine is at a high or maximum RPM. Thus, the electric motor 12 would be called on to provide the majority of the required motive force, through the differential gear set 14, for the transmission pump 16 with only minimal or supplemental input coming from the coupling with the engine. As such, no or very little excess in ATF flow would ever occur, since the power input from the electric motor 12 is closely controlled by the line pressure control device 13. This would also preclude the necessity of recovering excessive mechanical energy from the engine and converting it to electrical energy.

By way of another example, the differential gear set 14 could be designed so that the transmission pump 16 would be driven by the vehicle engine so as to meet all possible lubrication, actuation and cooling requirements of the transmission when the engine reaches some intermediate RPM value between engine idle and maximum. This would require that the electric motor 12 provide some portion of the required drive force, through the differential gear set 14, up to the point the line pressure control device 13 senses an excess in pressure (from both the electric motor and vehicle engine) and turns off the electric motor 12. As such, this would reduce the amount of excess ATF flow and still allow a conversion of excess mechanical energy from the engine operation of the transmission pump 16 to electrical energy by the electric motor 12 during portions of the operation range of the vehicle.

Accordingly, the present invention provides a hydraulic transmission pump having a differential actuation with an integrated line pressure control device that overcomes the drawbacks of conventional designs, which cannot provide proper ATF flow to the transmission when the engine is off or below idle speed. Additionally, the present invention is more efficient than the prior art as it provides the required, regulated ATF flow anytime the engine is at idle or above, while concurrently converting any excess applied engine power into usable electrical energy that is fed back to the vehicle electrical system. Furthermore, these objectives are achieved by the present invention in an efficient, cost effective and relatively simple manner.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A hydraulic transmission pump assembly comprising:
    a pump adapted to provide fluid under pressure to predetermined components in a transmission;
    an electric motor operatively coupled to said pump;
    a line pressure control device in electrical communication with said electric motor, said line pressure control device operable to control said electric motor as to cause said electric motor to drive said pump when engine speeds are below a predetermined level such that pump provides fluid at a predetermined volume and pressure to the transmission during this operating condition; and
    a differential gear assembly interposed between an engine and said electric motor, said differential gear assembly acting to drive both said pump and said electric motor when engine speeds are above said predetermined level such that said pump provides fluid at a predetermined volume and pressure to the transmission and said electric motor provides generated electricity.

2. A hydraulic transmission pump assembly as set forth in claim 1 wherein said line pressure control device is further operatively connected to the output of said pump and is adapted to monitor the fluid pressure output of said pump so that said line pressure control device turns off said electric motor when monitored pressure from said pump is greater that a predetermined upper value and turns on said electrical motor when monitored pressure from said pump falls below a predetermined lower value.

3. A hydraulic transmission pump assembly as set forth in claim 1 wherein said line pressure control device is further operatively connected to the output of said pump and is adapted to monitor the fluid pressure output of said pump so that said line pressure control device varies the electrical current applied to said electrical motor such that the speed of said electrical motor is varied to maintain the monitored pressure from said pump within a predetermined range.

4. A hydraulic transmission pump assembly as set forth in claim 1 wherein said line pressure control device is in further electrical connection to a transmission control device that monitors the fluid pressure output of said pump and provides control signals to said line pressure control device thereby causing said line pressure control device to turn said electric motor on and off in response to changes in the fluid pressure output of said pump such that said line pressure control device turns off said electric motor when monitored pressure from said pump is greater that a predetermined upper value and turns on said electrical motor when monitored pressure from said pump falls below a predetermined lower value.

5. A hydraulic transmission pump assembly as set forth in claim 1 wherein said line pressure control device is in further electrical connection to a transmission control device that monitors the fluid pressure output of said pump and provides control signals to said line pressure control device thereby causing said line pressure control device to vary the electrical current applied to said electrical motor such that the speed of said electrical motor is varied to maintain the monitored pressure from said pump within a predetermined range.

6. A hydraulic transmission pump assembly as set forth in claim 1 wherein said line pressure control device is in further electrical connection to a transmission control device through a control area network that includes a digital data interface to allow the transfer of digital data between the transmission control device and said line pressure control device.

7. A hydraulic transmission pump assembly as set forth in claim 1 wherein said pump is a gerotor type pump having an inner pumping gear element including external teeth and an outer pumping gear element having internal teeth wherein the number of external teeth of said inner pumping gear element in one less than the number of said internal teeth of said outer pumping gear element such that said external gear teeth of said inner pumping gear element mesh with said internal teeth of said outer pumping gear element to provide a pumping action therebetween thereby providing fluid under pressure to the transmission.

8. A hydraulic transmission pump assembly as set forth in claim 7 wherein said inner pumping gear element is operatively disposed on a common driven shaft defining a central pump axis, said outer pumping gear element defining an axis which is offset relative to said central pump axis so that said internal and external teeth of said inner pumping gear element and said outer pumping gear element respectively define pumping chambers that expand and contract as said gear elements rotate relative to one another.

9. A hydraulic transmission pump assembly as set forth in claim 8 wherein said pump further comprises a pump body having an inlet and an outlet port adapted to take in a fluid media at a first lower pressure through said inlet port and delivering the fluid media through said outlet port at a second higher pressure.

10. A hydraulic transmission pump assembly as set forth in claim 9 wherein said pump body comprises an inlet passage operatively connected to said inlet port and an outlet passage operatively connected to said outlet port such that said inlet passage delivers fluid media at said first lower pressure to said expanding pumping chambers and said outlet passage receives fluid media at said second higher pressure from said contracting pumping chambers.

11. A hydraulic transmission pump assembly as set forth in claim 10 wherein said differential gear assembly includes an input gear operatively coupled to the engine, a ring gear operatively coupled to said input gear and a sun gear operatively coupled to said common driven shaft and operatively interconnected in driven relationship with said ring gear.

12. A hydraulic transmission pump assembly as set forth in claim 11 wherein said differential gear assembly further includes a carrier having a plurality of planetary gears operatively disposed within said carrier.

13. A hydraulic transmission pump assembly as set forth in claim 12 wherein said plurality of planetary gears are disposed within said carrier on a respective plurality of stub shafts said planetary gears interposed in meshing relationship between said sun gear and said ring gear.

14. A hydraulic transmission pump assembly as set forth in claim 13 wherein said differential, said pump, and said electric motor are concomitantly disposed along a common driven shaft and are operatively interconnected together.

15. A hydraulic transmission pump assembly as set forth in claim 14 wherein said electric motor has an extended output shaft adapted to serve as said common driven shaft and that is operatively connected to said sun gear of said differential while operatively passing through said inner pumping gear element of said pump.

16. A hydraulic transmission pump assembly as set forth in claim 15 wherein said differential, said pump, and said electric motor are concomitantly disposed along said extended output shaft of said electric motor such that said output shaft passes through said inner pumping gear element of said pump and operatively connects to said sun gear of said differential gear assembly, said sun gear operatively connected to said inner pumping element of said pump.

17. A hydraulic transmission pump comprising:

a planetary gear set differential adapted to accept and transfer rotational power from both an engine of a motor vehicle and an electrical motor;

a gerotor pump adapted to accept rotational power from said differential and provide a volume of pressurized hydraulic fluid to a transmission of a motor vehicle;

said electric motor adapted to provide rotational power to said differential; and a line pressure control device in electrical communication with said electric motor adapted to control said electric motor.

18. A hydraulic power supply as set forth in claim 17 wherein said line pressure control device is operable operatively connected to the output of said pump and is adapted to monitor the fluid pressure output of said pump so that said line pressure control device turns off said electric motor when monitored pressure from said pump is greater that a predetermined upper value and turns on said electrical motor when monitored pressure from said pump falls below a predetermined lower value.

19. A hydraulic transmission pump assembly as set forth in claim 17 wherein said line pressure control device is further operatively connected to the output of said pump and is adapted to monitor the fluid pressure output of said pump so that said line pressure control device varies the electrical current applied to said electrical motor such that the speed of said electrical motor is varied to maintain the monitored pressure from said pump within a predetermined range.

20. A hydraulic transmission pump comprising:

a differential gear set adapted to accept and transfer rotational power from both an engine of a motor vehicle and an electrical motor;

a pump adapted to accept rotational power from said differential and provide a volume of pressurized hydraulic fluid to a transmission of a motor vehicle;

said electric motor adapted to provide rotational power to said differential and adapted to be operatively controlled by a line pressure control device which monitors the fluid pressure output of said pump so that said line pressure control device varies the electrical current applied to said electrical motor such that the speed of said electrical motor is varied to maintain the monitored pressure from said pump within a predetermined range.

* * * * *